(12) United States Patent
Reich et al.

(10) Patent No.: US 7,387,393 B2
(45) Date of Patent: Jun. 17, 2008

(54) METHODS FOR PRODUCING LOW-VISIBILITY RETROREFLECTIVE VISUAL TAGS

(75) Inventors: James E. Reich, San Francisco, CA (US); Patrick C. P. Cheung, Castro Valley, CA (US); Eric J. Shrader, Belmont, CA (US); Qingfeng Huang, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 134 days.

(21) Appl. No.: 11/312,854

(22) Filed: Dec. 19, 2005

(65) Prior Publication Data

US 2007/0139775 A1 Jun. 21, 2007

(51) Int. Cl.
*G02B 5/122* (2006.01)
*G06K 7/10* (2006.01)
(52) U.S. Cl. .................. 359/529; 359/350
(58) Field of Classification Search ........ 359/515, 359/351
See application file for complete search history.

(56) References Cited

U.S. PATENT DOCUMENTS

| 3,758,193 | A | * | 9/1973 | Tung | 359/359 |
|---|---|---|---|---|---|
| 4,175,775 | A | * | 11/1979 | Kruegle | 283/88 |
| 4,222,662 | A | * | 9/1980 | Kruegle | 355/40 |
| 5,200,851 | A | * | 4/1993 | Coderre et al. | 359/351 |
| 6,024,455 | A | * | 2/2000 | O'Neill et al. | 359/530 |
| 6,446,865 | B1 | * | 9/2002 | Holt et al. | 235/382 |
| 6,537,673 | B2 | * | 3/2003 | Sada et al. | 428/432 |
| 7,207,494 | B2 | * | 4/2007 | Theodossiou et al. | 235/487 |
| 2006/0138225 | A1 | * | 6/2006 | Richley et al. | 235/385 |

OTHER PUBLICATIONS

Publication: "*Localization of Wearable Users Using Invisible Retro-Reflective Markers and an IR Camera*", by Yusuke Nakazato et al., Dec. 2004, Graduate School of Information Science, Nara Institute of Science and Technology, 8916-5 Takayama, Ikoma, Nara, 630-0192, Japan, http://yokoya.aist-nara.ac.jp/paper/datas/788/spie2005nakazatoM.pdf.
Publication: "*Invisible Marker Tracking for AR*", by Hanhoon Park and Jon-II Park of Hanyang University, Seal, Korea, Proceedings of the Third IEEE and ACM International Symposium on Mixed and Augmented Reality (ISMAR 2004), http://csdl2.computer.org/comp/proceedings/ismar/2004/2191/00/21910272.pdf.

* cited by examiner

*Primary Examiner*—Stephone B. Allen
*Assistant Examiner*—Jade Callaway
(74) *Attorney, Agent, or Firm*—Park, Vaughan & Fleming LLP

(57) ABSTRACT

A process for producing a low-visibility retroreflective visual tag, which can be used to identify and/or determine the position of an object. This process involves placing an infra-red-blocking material over a retroreflective substrate to form the low-visibility retroreflective visual tag. This infra-red-blocking material is placed so as to form a pattern, which becomes visible to an infrared sensor when the low-visibility retroreflective visual tag is illuminated by an infra-red light source.

21 Claims, 5 Drawing Sheets

METHODS FOR PRODUCING LOW-VISIBILITY RETROREFLECTIVE VISUAL TAGS

BACKGROUND

1. Field of the Invention

The present invention relates to techniques for manufacturing visual tags or makers. More specifically, the present invention relates to techniques for producing low-visibility retroreflective visual tags.

2. Related Art

A relatively inexpensive technique for identifying an object and for determining the position of an object in the physical world is to attach a Radio Frequency Identification (RFID) tag to the object. RFID tags are relatively small and inexpensive, and generally do not require a power source. Because of these advantages, RFID tags (although mostly of the battery-powered "active" variety) are widely used in numerous applications as diverse as inventory-control systems, and electronic toll booths on freeways.

However, existing unpowered "passive" RFID tag readers cannot pinpoint the exact location of an object. Rather, they simply report the presence or absence of a tag in their field of sensitivity. Moreover, RFID tag readers only operate at short range. They also function badly in the presence of metal, and interfere with each other when many tagged objects are present.

Some of these problems can be overcome by using active RFID technology or similar methods, such as ultrasound. However, these techniques require expensive, power-consuming electronics and batteries, and they still may not determine position accurately when attached to dense or metallic objects.

Visual tag-based methods do not have the same problems, but the task of recognizing visual tags is itself a complicated problem, which requires a large amount of computation. Consequently, existing systems have difficulty distinguishing tags from complex backgrounds or handling variable lighting. They also require too much computational power to be practical in many applications. Moreover, large, visually-prominent tags, which are easier to recognize, are not aesthetically pleasing, and are consequently unsuitable for many applications.

Hence, what is needed is a method and an apparatus for identifying and/or determining the position of an object without the above-described problems of existing systems.

SUMMARY

One embodiment of the present invention provides a process for producing a low-visibility retroreflective visual tag, which can be used to identify and/or determine the position of an object. This process involves placing an infra-red-blocking material over a retroreflective substrate to form the low-visibility retroreflective visual tag. This infra-red-blocking material is placed so as to form a pattern, which becomes visible to an infrared sensor when the low-visibility retroreflective visual tag is illuminated by an infra-red light source.

In a variation on this embodiment, placing the infra-red-blocking material over the retroreflective substrate involves depositing the infra-red-blocking material onto the retroreflective substrate.

In another variation on this embodiment, placing the infra-red-blocking material over the retroreflective substrate involves depositing the infra-red-blocking material onto a sheet of infra-red-transparent material, and then laminating (or otherwise attaching) the sheet of infra-red-transparent material over the retroreflective substrate.

In a variation on this embodiment, the infra-red-blocking material can include: an ink, a dye, a toner, or a pigment.

In a variation on this embodiment, placing the infra-red-blocking material over the retroreflective substrate additionally involves placing an infra-red-transparent material over the retroreflective substrate. In this embodiment, the infra-red-transparent material and the infra-red-blocking material have visible colors so that the resulting low-visibility retroreflective visual tag produces a visible pattern under visible light. This visible pattern is different than (and is possibly uncorrelated with) an infra-red pattern which is produced by the low-visibility retroreflective visual tag under infrared light.

In a further variation, this infra-red-transparent material can include: an ink, a dye, a toner, or a pigment.

In a variation on this embodiment, in addition to the infra-red-blocking material which is placed over the retroreflective substrate, the process places an infra-red-transparent material over the low-visibility retroreflective visual tag. This infra-red-transparent material has one or more visible colors, which form a standardized visible pattern which makes it easier to identify a low-visibility retroreflective visual tag.

In a variation on this embodiment, the retroreflective substrate is in the form of a pre-printed sheet or label, which is the size of a standard-sized sheet of paper. This sheet can be pre-printed with an "invisible" IR-reflective pattern. This allows a visible pattern to be printed on the sheet using an infra-red-transparent material or in non-marked parts of the sheet, thereby allowing users to print their content onto sheets which are pre-printed with tags which are only visible using an IR illuminator and camera.

In a variation on this embodiment, the retroreflective substrate is in the form of a pre-printed sheet or label. This sheet can be pre-printed with a pattern that is visible under infra-red light and/or a pattern that is visible under visible light. In this variation, placing the infra-red-blocking material over the retroreflective substrate, or placing an infra-red-transparent material over the retroreflective substrate, involves using a computer printer to print the infra-red-blocking material or the infra-red-transparent material onto the retroreflective substrate.

In a variation on this embodiment, the retroreflective substrate includes: reflective corner cubes, or transparent spheres with a refractive index substantially equal to 2.

One embodiment of the present invention provides a process for producing a low-visibility retroreflective visual tag. This process operates by depositing a retroreflective material onto a desired object to form the low-visibility retroreflective visual tag. This retroreflective material is deposited so as to form a pattern which becomes visible to an infrared sensor when the low-visibility retroreflective visual tag is illuminated by an infra-red light source. Furthermore, this retroreflective material is substantially transparent to visible light. Consequently, the pattern formed by the retroreflective material is less visible under visible light, and an underlying visible pattern on the desired object is visible through the retroreflective material.

DETAILED DESCRIPTION

Figure 1:
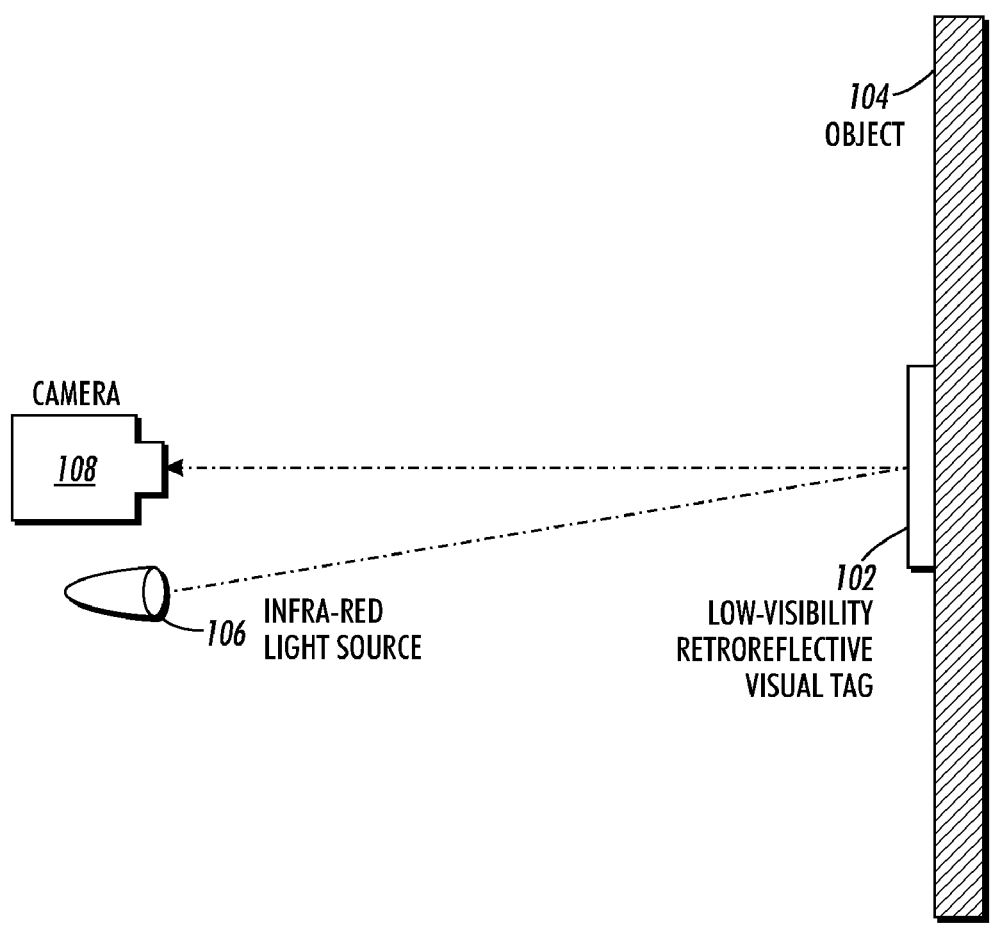
FIG. 1 illustrates the process of illuminating and viewing a low-visibility retroreflective visual tag in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

The following disclosure describes a number of methods for producing and using low-visibility retroreflective tags. These tags can be attached to a desired object so that when to tag is illuminated with an infra-red light source, the tag reflects the infra-red light back to an infra-red sensitive camera located near the light source. At the same time, infra-red light hitting other parts of the object is reflected in other directions and is consequently diffused significantly. As a result, the tags are visible with extremely high contrast and can be picked out reliably and easily from the background using a number of techniques, some of which are described below.

One embodiment of the present invention senses both identity information, encoded in the shape of the reflective or non-reflective portions of the tag, and location information, based on the tag's position in the camera's field of view. These visual tags can be made "invisible" by assuring that the contrast between reflective and non-reflective portions of the tag is invisible or has low-visibility within the visible portion of the spectrum.

Furthermore, the tags may be mass-produced inexpensively using a number of methods, such as printing, rubber-stamping or laser-cutting. In addition to using a tag to identifying and localize an object, the object may also be marked or outlined to allow other quantities to be easily measured, such as the orientation or pose of the object.

These tags can be produced through a number of different techniques. These techniques produce tags which are visible at the source of the infra-red illumination, but have low-visibility (or are entirely invisible) in the visible spectrum.

This approach has significant advantages over traditional methods of visual tagging or visual object recognition because it provides high contrast and the ability to control the illumination. The high contrast results from the use of a "retroreflective" material which contains three-faced inside corner cubes (or alternatively, transparent spheres with a refractive index substantially equal to 2), which reflect all incident light directly back to the location of the light source.

Hence, infra-red light emitting diodes (LEDs) positioned around an infrared-sensitive imager, such as an off-the-shelf CCD or CMOS imager (with the standard infra-red-blocking filter removed), allows controllable illumination to be used to produce a bright image of the reflective tag in the camera optics.

In addition, this contrast may be further increased by using a laser illuminator rather than a visible light illuminator, which allows essentially all of the illumination to fall on the tag rather than spreading the illumination over an increasingly large area as the tag becomes more distant.

Figure 6:
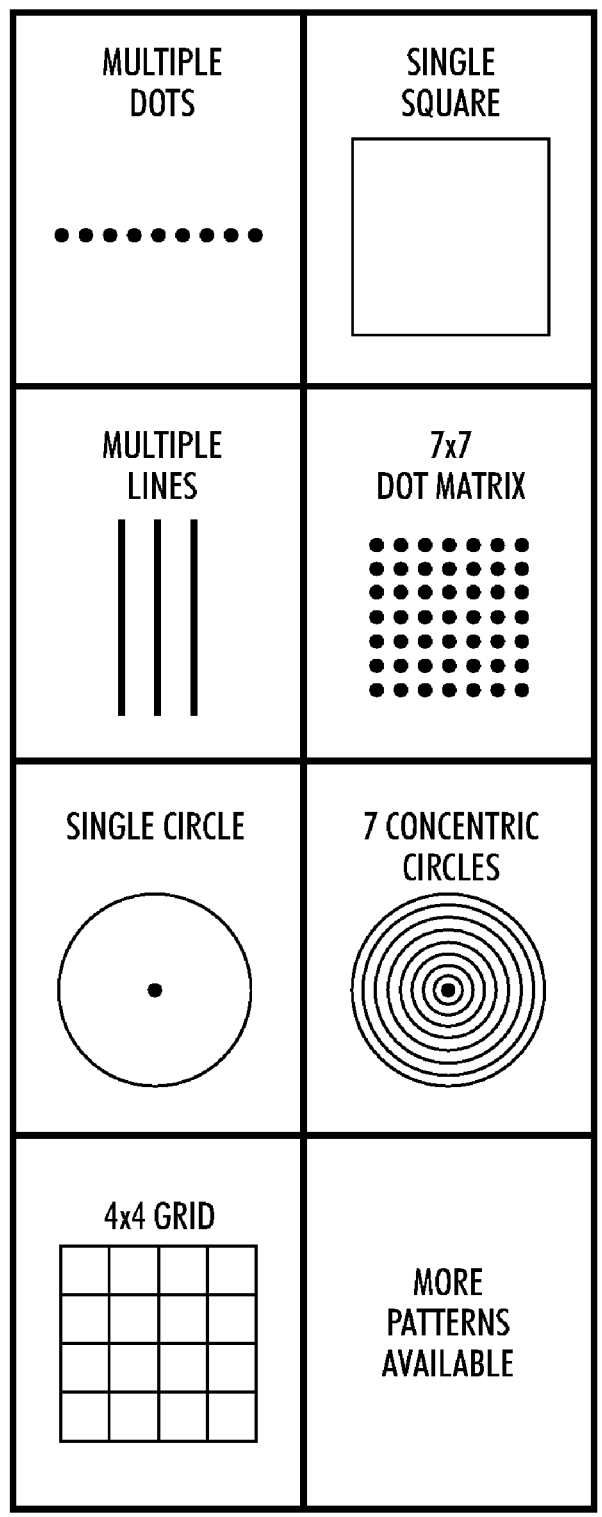
FIG. 6 illustrates different "structured light illumination patterns" in accordance with an embodiment of the present invention.

Furthermore, this light can be used in a "structured light" illumination pattern using a diffractive optical pattern generator (as shown in FIG. 6) or by using a mechanical beam steering mechanism, such as a steerable mirror. Contrast may be even further increased by use of a narrow band-pass filter at the wavelength of the LED or laser.

In addition to tagging and marking applications, similar methods for producing and illuminating patterned retroreflective objects can be used to enhance the recognition of objects, and to determine the orientation and pose of objects. For example, a box might be outlined with retroreflective material so that a "wireframe" outline of the box which becomes easily visible with IR illumination, allowing the three-dimensional shape and orientation to be recovered more easily. In another example, a user of a video game application might carry a simulated sword with a retroreflective tag and coordinate system outlined on it to make the orientation and the identity of the sword easy to detect. Similarly, an arbitrary image frame, such as the borders of a whiteboard or a picture frame, can be outlined using this technique to enable the image to be easily located and transformed to remove perspective effects and other distortions.

Viewing a Low-Visibility Retroreflective Visual Tag

FIG. 1 illustrates the process of illuminating and viewing a low-visibility retroreflective visual tag in accordance with an embodiment of the present invention. During this process, an infra-red light source 106, such as an infra-red LED or a laser, illuminates a low-visibility retroreflective tag 102, which is located on an object 104. This retroreflective tag reflects the infra-red light straight back infra-red light source 106, where it is captured by a nearby infra-red sensor, such as a camera 108.

In one embodiment of the present invention, the infra-red light source 106 is "pulsed," so that different images can be captured with and without infra-red illumination. In this way, the non-illuminated image can be "subtracted" from the illuminated image to highlight the retroreflective pattern.

Producing a Tag by Overprinting onto a Retroreflective Substrate

Figure 2:
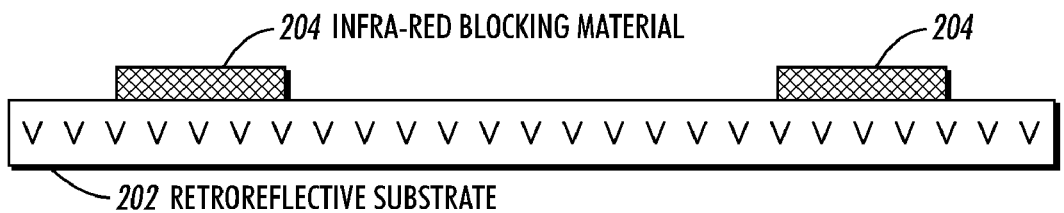
FIG. 2 illustrates the structure of a low-visibility retroreflective visual tag in accordance with an embodiment of the present invention.
Figure 7:
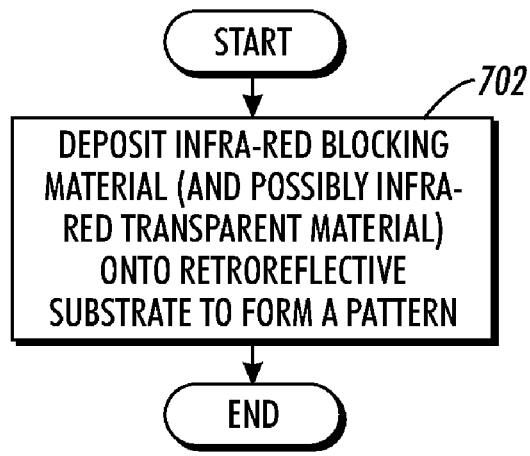
FIG. 7 presents a flow chart of the process of creating a low-visibility retroreflective visual tag in accordance with an embodiment of the present invention.

FIG. 2 illustrates the structure of a low-visibility retroreflective visual tag in accordance with an embodiment of the present invention. In this embodiment, an infrared-blocking material 204 (such as an ink, a dye, a toner, or a pigment) is deposited (for example, by printing or stamping) onto a retroreflective substrate 202 (see step 702 in FIG. 7).

Producing a Tag by Printing onto an Infra-red-transparent Sheet

Figure 3:
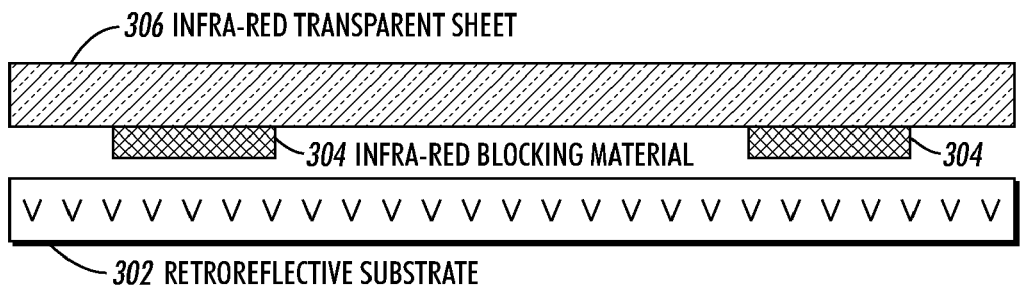
FIG. 3 illustrates an alterative structure for a low-visibility retroreflective visual tag in accordance with an embodiment of the present invention.
Figure 8:
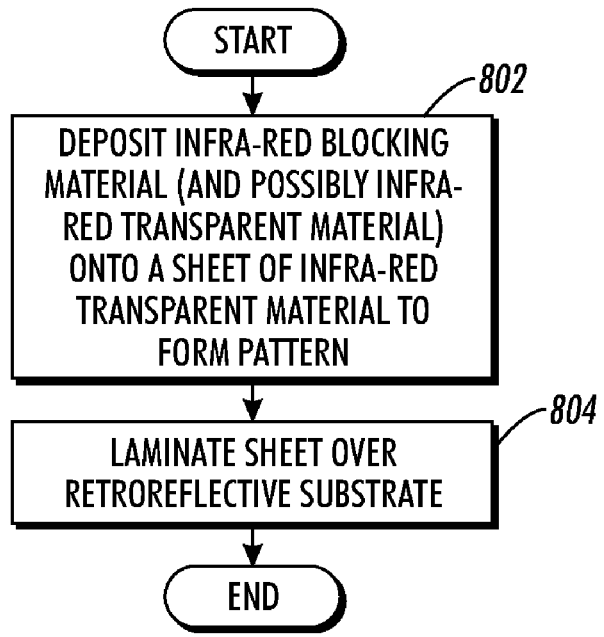
FIG. 8 presents a flow chart of the process of creating a low-visibility retroreflective visual tag in accordance with another embodiment of the present invention.

FIG. 3 illustrates yet another alternative structure for a low-visibility retroreflective visual tag in accordance with an embodiment of the present invention. In this embodiment, the infra-red-blocking material 304 is deposited onto an infra-red-transparent sheet 306 (see step 802 in FIG. 8). This sheet is then laminated or otherwise attached to a retroreflective substrate 302 (see step 804 in FIG. 8).

Producing a Tag with Different Visible and Infra-Red Patterns

Note that an infra-red-transparent material which has a visible color can be deposited on a retroreflective substrate 402, along with the infra-red-blocking material. This makes it possible to produce a retroreflective visual tag which produces a visible pattern under visible light which is different from (and is possibly uncorrelated with) a pattern produced by the tag under infra-red light.

Figure 4:
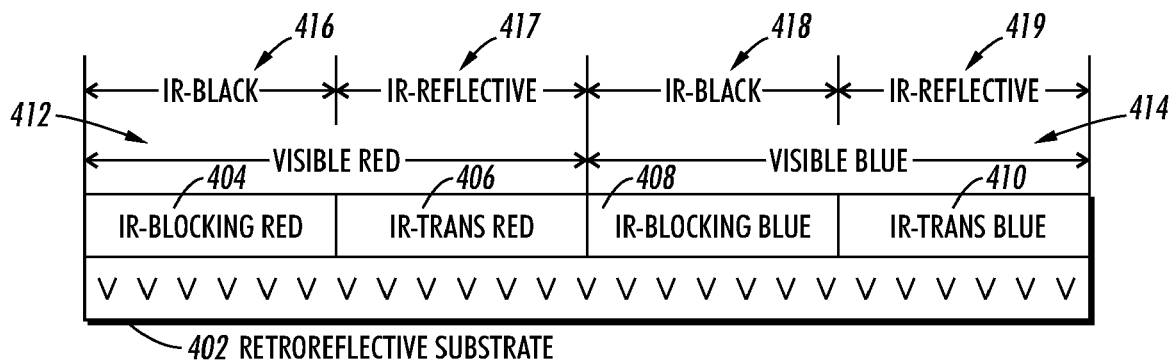
FIG. 4 illustrates yet another alternative structure for a low-visibility retroreflective visual tag in accordance with an embodiment of the present invention.

The exemplary tag illustrated in FIG. 4 has a retroreflective substrate 402 upon which a number of different types of material are deposited. These materials include: (1) an infra-red-blocking red material 404 that produces a red color under visible light, but blocks infrared light from reflecting off of the underlying retroreflective substrate 402; (2) an infra-red-transparent red material 406 that produces a red color under visible light, but is transparent to infrared light, so that infra-red light can reflect off of the underlying retroreflective substrate 402; (3) an infra-red-blocking blue material 408 that produces a blue color under visible light, but blocks infrared light; (4) and an infra-red-transparent blue material 410 that produces a blue color under visible light, but is transparent to infrared light.

When viewed under visible light, the tag illustrated in FIG. 4 has a visible red region 412, which spans both the region covered by infra-red-blocking red material 404 and infra-red-transparent red material 406. Similarly, the tag has a visible blue region 414, which spans both the region covered by infra-red-blocking blue material 408 and infra-red-transparent blue material 410.

In contrast, when viewed under infra-red light, the tag illustrated in FIG. 4 produces reflected infra-red light from regions covered by infra-red-transparent red material 406 (i.e., infrared-reflective region 417) and infra-red-transparent blue material 410 (i.e., infrared-reflective region 419). No infra-red light is reflected by regions covered by infra-red-blocking red material 404 (i.e., infrared-black region 416) and infra-red-blocking blue material 408 i.e. infrared-black region 418).

Note that by using this technique it is possible to manufacture a tag which produces a visible image under visible light, which is different than (and is possibly uncorrelated with) the image of the tag produced under infra-red light.

Producing a Tag by Cutting Retroreflective Material

Figure 5:
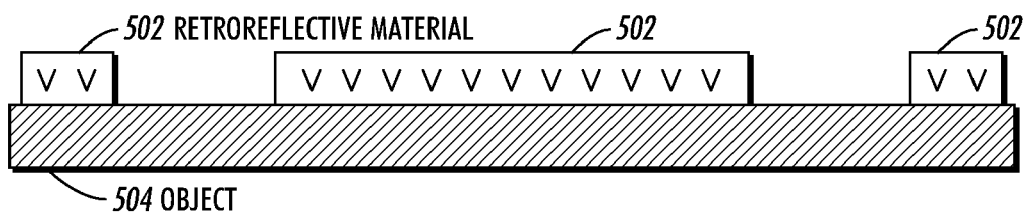
FIG. 5 illustrates how low-visibility retroreflective visual tag can be produced so that a visible pattern produced by the tag under visible light is different from (and is possibly uncorrelated with) a pattern produced by the tag under infra-red light in accordance with an embodiment of the present invention.
Figure 9:
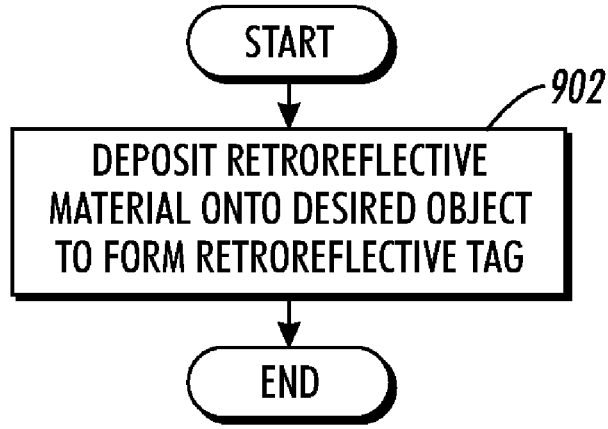
FIG. 9 presents a flow chart of the process of creating a low-visibility retroreflective visual tag in accordance with yet another embodiment of the present invention.

FIG. 5 illustrates an alterative structure for a low-visibility retroreflective visual tag in accordance with an embodiment of the present invention. In this alternative structure, retroreflective material 502 is deposited onto an object 504 to form a pattern (see step 902 in FIG. 9). This can involve either cutting the retroreflective material 502 into shapes, printing the retroreflective material, or stamping the retroreflective material onto object 504.

Standardized Visible Pattern

Figure 10:
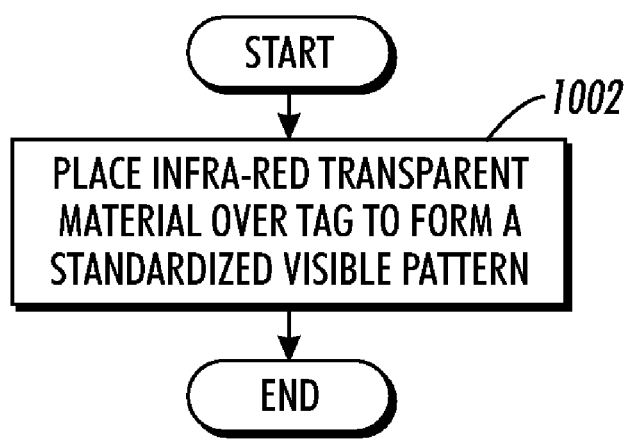
FIG. 10 presents a flow chart of the process of creating a visible marker for a low-visibility retroreflective visual tag in accordance with yet another embodiment of the present invention.

After the retroreflective visual tag is created, a standardized visible pattern can be added to the visual tag by placing an infra-red-transparent material, which has one or more visible colors, over the retroreflective visual tag (see step 1002 in FIG. 10). This infra-red-transparent material forms a standardized visible pattern which makes it easier to recognize the retroreflective visual tag.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for producing a low-visibility retroreflective visual tag, comprising:
   placing an infra-red-blocking material over a retroreflective substrate to form the low-visibility retroreflective visual tag;
   wherein the infra-red-blocking material is placed to form a pattern, wherein the pattern becomes visible to an infrared sensor when the low-visibility retroreflective visual tag is illuminated by an infra-red light source; and wherein the infra-red-blocking material substantially blocks infra-red light but allows visible light to pass through the infra-red-blocking material.

2. The method of claim 1, wherein the retroreflective substrate includes:
   reflective corner cubes; or
   transparent spheres with a refractive index substantially equal to 2.

3. The method of claim 1, wherein placing the infra-red-blocking material over the retroreflective substrate involves:
   depositing the infra-red-blocking material onto the retroreflective substrate; or
   depositing the infra-red-blocking material onto a sheet of infra-red-transparent material and then attaching the sheet of infra-red-transparent material over the retroreflective substrate.

4. The method of claim 1, wherein the infra-red-blocking material can include:
   an ink;
   a dye;
   a toner; or
   a pigment.

5. The method of claim 1,
wherein placing the infra-red-blocking material over the retroreflective substrate additionally involves placing an infra-red-transparent material over the retroreflective substrate;
wherein the infra-red-transparent material and the infra-red-blocking material have visible colors; and
wherein the resulting low-visibility retroreflective visual tag produces a visible pattern under visible light, which is different than an infra-red pattern which is produced by the low-visibility retroreflective visual tag under infrared light.

6. The method of claim 5, wherein the infra-red-transparent material can include:
an ink;
a dye;
a toner; or
a pigment.

7. The method of claim 1,
wherein after the infra-red-blocking material is placed over the retroreflective substrate, the method further comprises placing an infra-red-transparent material over the low-visibility retroreflective visual tag;
wherein the infra-red-transparent material has one or more visible colors; and
wherein the infra-red-transparent material forms a standardized visible pattern which signifies a low-visibility retroreflective visual tag.

8. The method of claim 1,
wherein the retroreflective substrate is in the form of a pre-printed sheet or label, which is the size of a standard-sized sheet of paper;
wherein the retroreflective substrate is pre-printed with an "invisible" IR-reflective pattern; and
wherein a visible pattern can be printed using an infra-red-transparent material or in non-marked parts of the sheet, allowing users to print their content onto sheets which are pre-printed with tags which are only visible using an IR illuminator and camera.

9. The method of claim 1,
wherein the retroreflective substrate is in the form of a pre-printed sheet or label, which is the size of a standard-sized sheet of paper;
wherein the retroreflective substrate is possibly pre-printed with a pattern that is visible under infra-red light and/or a pattern that is visible under visible light; and
wherein placing the infra-red-blocking material over the retroreflective substrate, or placing an infra-red-transparent material over the retroreflective substrate, involves using a computer printer to print the infra-red-blocking material or the infra-red-transparent material onto the retroreflective substrate.

10. A method for producing a low-visibility retroreflective visual tag, comprising:
depositing a retroreflective material onto a desired object to form the low-visibility retroreflective visual tag;
wherein the retroreflective material is deposited in a pattern which becomes visible to an infrared sensor when the low-visibility retroreflective visual tag is illuminated by an infra-red light source; and
wherein the retroreflective material is substantially transparent to visible light so that the pattern is less visible under visible light.

11. The method of claim 10, wherein the desired object has an underlying visible pattern which is visible through the retroreflective material.

12. The method of claim 10, wherein the retroreflective material can include:
an ink;
a dye;
a toner; or
a pigment.

13. A low-visibility retroreflective visual tag, which is produced by a process which involves:
placing an infra-red-blocking material over a retroreflective substrate to form the low-visibility retroreflective visual tag;
wherein the infra-red-blocking material is placed to form a pattern, wherein the pattern becomes visible to an infrared sensor when the low-visibility retroreflective visual tag is illuminated by an infra-red light source; and wherein the infra-red-blocking material substantially blocks infra-red light but allows visible light to pass through the infra-red-blocking material.

14. The low-visibility retroreflective visual tag of claim 13, wherein the retroreflective substrate includes:
reflective corner cubes; or
transparent spheres with a refractive index substantially equal to 2.

15. The low-visibility retroreflective visual tag of claim 13, wherein placing the infra-red-blocking material over the retroreflective substrate involves:
depositing the infra-red-blocking material onto the retroreflective substrate; or
depositing the infra-red-blocking material onto a sheet of infra-red-transparent material and then attaching the sheet of infra-red-transparent material over the retroreflective substrate.

16. The low-visibility retroreflective visual tag of claim 13, wherein the infra-red-blocking material can include:
an ink;
a dye;
a toner; or
a pigment.

17. The low-visibility retroreflective visual tag of claim 13,
wherein placing the infra-red-blocking material over the retroreflective substrate additionally involves placing an infra-red-transparent material over the retroreflective substrate;
wherein the infra-red-transparent material and the infra-red-blocking material have visible colors; and
wherein the resulting low-visibility retroreflective visual tag produces a visible pattern under visible light, which is different than an infra-red pattern which is produced by the low-visibility retroreflective visual tag under infrared light.

18. The low-visibility retroreflective visual tag of claim 17, wherein the infra-red-transparent material can include:
an ink;
a dye;
a toner; or
a pigment.

19. The low-visibility retroreflective visual tag of claim 13,
wherein after the infra-red-blocking material is placed over the retroreflective substrate, the process additionally involves placing an infra-red-transparent material over the low-visibility retroreflective visual tag;

wherein the infra-red-transparent material has one or more visible colors; and wherein the infra-red-transparent material forms a standardized visible pattern which signifies a low-visibility retroreflective visual tag.

20. The low-visibility retroreflective visual tag of claim 13, wherein the retroreflective substrate is in the form of a pre-printed sheet or label, which is the size of a standard-sized sheet of paper;

wherein the retroreflective substrate is pre-printed with an "invisible" IR-reflective pattern; and wherein a visible pattern can be printed using an infra-red-transparent material or in non-marked parts of the sheet, allowing users to print their content onto sheets which are pre-printed with tags which are only visible using an IR illuminator and camera.

21. The low-visibility retroreflective visual tag of claim 13, wherein the retroreflective substrate is in the form of a pre-printed sheet or label, which is the size of a standard-sized sheet of paper;

wherein the retroreflective substrate is possibly pre-printed with a pattern that is visible under infra-red light and/or a pattern that is visible under visible light; and wherein placing the infra-red-blocking material over the retroreflective substrate, or placing an infra-red-transparent material over the retroreflective substrate, involves using a computer printer to print the infra-red-blocking material or the infra-red-transparent material onto the retroreflective substrate.

* * * * *